United States Patent Office 3,700,616
Patented Oct. 24, 1972

3,700,616
SCULPTURABLE MOLDING COMPOSITIONS
Thomas Zawadzki, Princeton, N.J., assignor to
Paul F. O'Neil, Rumson, N.J.
No Drawing. Filed Dec. 3, 1969, Ser. No. 881,904
Int. Cl. C08f *45/38, 45/40*
U.S. Cl. 260—31.6 R                                    4 Claims

ABSTRACT OF THE DISCLOSURE

Compositions comprising vinyl chloride and vinyl chloride copolymers, plasticizers, thixotropic agents and fillers are disclosed which are hand and tool workable like modeling clay, at room temperatures and form a hard, fused mass at elevated temperatures.

---

This invention relates to an improved synthetic resin molding molding composition useful in the art of modeling and manufacture of models. In the manufacture of automobiles, appliances and such, one step usually involves the making or sculpturing of a model, usually full sized, of the item to better understand and appreciate the item's utility and aesthetics. Such models are presently produced in plaster of paris, clay, wood or plastics, each of which have their advantages and disadvantages. Wood, plastic and plaster of paris are difficult to work. Clays, which are easy to work, are subject to indentation, heat, sag and other handling damage since they remain plastic indefinitely.

Several molding materials have been suggested in the prior art which are readily sculptured by conventional sculpturing instruments at room temperatures and which may be subsequently hardened without appreciable shrinkage to provide the finished model with a high degree of permanence and handleability. For example, in U.S. Pat. 3,171,823, there is disclosed a dispersion of vinyl resin such as polyvinyl chloride in a plastisol-grade plasticizer with certain proportions of an ordinary filler, a thixotropic filler and a combination of beeswax and castor oil. The vinyl resin is not appreciably soluble in the plasticizer at room temperatures, but is soluble at elevated fusion temperatures. The vinyl resin dispersion may be molded and then formed into a hard mass by heating the dispersion to its solvation temperature to effect solution of the resin and the plasticizer. This composition depends upon a beeswax and castor oil to provide a workable and moldable product. With castor oil alone, the dispersion is a crumbly nonadhesive product and with beeswax alone, the dispersion is not workable or moldable at temperatures lower than approximately 150° F. Even when castor oil and beeswax are used together in proper proportions, the composition must be heated to a temperature of about 140° F. before the modeling composition becomes sufficiently soft to be hand molded.

A plastic composition which can be molded, extruded, stamped or otherwise worked at room temperature using low-pressure equipment is disclosed in U.S. Pat. 2,753,-314 comprising vinyl chloride polymer, liquid plasticizer, a member selected from an amine adduct of bentonite, a silica aerogel and aluminum distearate. The compositions of U.S. Pat. 2,753,314 are particularly adaptable to use in extruding and molding equipment, however, the compositions tend to be somewhat sticky when used as for hand molding.

Thus, it would be very desirable if a molding composition were provided which is hand moldable at room temperature and hardenable at elevated temperatures.

It is therefore an object of this invention to provide an improved sculpturing material which can be worked by one's hands alone or in combination with standard sculpturing tools at ambient room temperatures. At ambient room temperatures, the compositions of this invention remain permanently formable and workable by hand, as well as by use of common sculpturing tools.

An additional objective of this invention is to present a molding composition which can be sculptured and hand formed at ambient room temperatures and which can be heat cured after sculpturing to form a hard, impact resistant, damage resistant, handleable and indentation resistant model.

These and other objects of the invention are accomplished by compounding together:

(1) A plastisol-grade vinyl chloride resin preferably selected from the group consisting of:

(a) polyvinyl chloride,
(b) vinyl chloride-vinyl acetate copolymer (e.g., 90:10, 95:5, or 87:13),
(c) vinyl chloride-vinylidene chloride copolymer (e.g., 90:10) and
(d) vinyl chloride-propylene copolymer, although other vinyl chloride plastisols can be used, e.g., vinyl chloride-trichloroethylene, vinyl chloride-dialkyl maleate;

(2) A diluent grade vinyl chloride resin preferably selected from the group consisting of:

(a) polyvinyl chloride,
(b) vinyl chloride-vinyl acetate copolymer (e.g., 87:13),
(c) vinyl chloride-vinylidene chloride copolymer (e.g., 85:15) and
(d) vinyl chloride-propylene copolymer (e.g., 90:10);

(3) Monomeric and polymeric plasticizers, either singly or in combination;
(4) A thixotropic agent or agents;
(5) Pigments, fillers and stabilizers.

The vinyl chloride copolymers generally contain at least 70% vinyl chloride, e.g. 70–99%.

In these various compositions the plasticizer disperses the plastisol grade resin which in the absence of any modifiers forms a fluid dilatent entity. The diluent resin, fillers and thioxtropic agents modify the properties of the dilatent resin, producing a good sculpturing composition, which at room temperature is hand formable and like model clay in its modeling properties. When this modified resin composition is heated, it cures into a fused, homologous structure.

The diluent resin, in the uncured composition, acts as an inert filler which at the curing temperature fuses with the plasticizers to become part of the fused homologous structure. In this way the diluent resin is used advantageously as a filler in the uncured, molding compositions, decreasing the dilatency of the plastisol resin-plasticizer combination. Then, during curing, the diluent resin reacts with the plasticizer by solvation to becoming part of the fused plastisol resin mass.

The preferred plastisol resins of this invention are copolymers of vinyl chloride and vinyl acetate, however, as mentioned earlier, the following resins are also applicable to this invention: (a) polyvinyl chloride, (b) vinyl chloride-vinylidene chloride copolymers and (c) vinyl chloride-propylene copolymer. The range in amount of vinyl acetate, vinylidene chloride and propylene in their respective vinyl chloride copolymer is usually from about 1 to 10%.

To obtain proper dispersion of the plastisol resin in the plasticizer, it is essential to use finely divided resins having a particle size of between 1 to 5 microns. Resins having such particle size range can be made, for example, by emulsion polymerization as disclosed in U.S. Pat. 2,068,424. The diluent resins, on the other hand, are intended to act as a filler in the uncured composition and therefore should not be appreciably dispersed by the plasticizer. Diluent resins having a particle size of between 5 to 75 microns remain substantially undispersed in the plasticizer and, therefore, are applicable in the present invention. The preferred diluent resins are copolymers of vinyl chloride and vinyl acetate, however, the following resins can be used in place of the preferred resin: (a) polyvinyl chloride, (b) vinyl chloride-vinylidene chloride copolymers and (c) vinyl chloride-propylene. As explained above, at the curing temperatures, both the plastisol resin and the diluent resin are dissolved by the plasticizer becoming a homologous fused mass. The diluent resin should be present in the proportions from 50 to 150 parts by weight. Secondary fillers such as clay, calcium carbonate, barium sulfate, fine particle silica, fine particle glass, glass bubbles, wood flour and fine particle organic and inorganic resins in quantities not to exceed 50 parts by weight can also be used in the composition.

The plasticizers should preferably be of three basic types, polymeric, medium molecular weight monomeric and low molecular weight monomeric. Each of the plasticizers performs separately in the modeling or in the curing of the composition.

The polymeric plasticizer is preferably of the polyester type, having a molecular weight of from about 569 to 8000 and a viscosity at 20° C. of from 2,000 to 200,000 centipoises. These polyester plasticizers are high molecular weight linear polyesters made through a condensation reaction under esterification conditions employing a dicarboxylic acid, acid anhydride or mixtures thereof and a mixture of glycols such as ethylene glycol and propylene glycol. Two examples of preferred polyester plasticizers are: (1) the products of the reaction of a mixture of phthalic anhydride, maleic anhydride and adipic acid with ethylene glycol and diethylene glycol and (2) the products of the reaction of sebacic acid and 1,2 propylene glycol. Other polyester plasticizers which can be used in place of the above mentioned plasticizers are ethylene glycol and propylene glycol esters of the following acids: sebacic, γ,γ-dibutyric, adipic, phthalic, terephthalic and isophthalic. In place of polyesters, certain other less preferable polymers can be used, e.g. polyallyl acetate, butadiene-acrylonitrile polymer, butadiene-styrene acrylonitrile polymer, polyallyl alkylates having 4 to 12 carbon atoms, e.g. polyallyl butyrate and polyallyl laurate. The proportions of polymeric plasticizer may vary from 20 to 60 parts by weight in the composition of this invention.

The preferred medium molecular weight monomeric plasticizer is ditridecyl phthalate with a molecular weight of 530 and an index of refraction of 1.4831. The preferred low molecular weight monomeric plasticizer is dibutyl phthalate with a molecular weight of 278 and an index of refraction of 1.4925.

Other medium molecular weight plasticizers having a molecular weight in the range of 378 to 875 can be used in the place of ditridecyl phthalate. Examples of such medium molecular weight plasticizers are diisooctyl phathalate, di-2-ethylhexyl phthalate, dicapryl phthalate, diisodecyl phthalate, isooctyl isodecyl phthalate, n-octyl n-decyl phthalate, isodecyl tridecyl phthalate, di-2-ethylhexyl isophthalate, triisooctyl trimellitate, tri-n-octyl n-decyl trimellitate, tri-2-ethylhexyl trimellitate, diisooctyl sebacate, di-2-ethylhexyl sebacate, dinonyl adipate, diisodecyl adipate, n-octyl n-decyl adipate and isooctyl isodecyl adipate.

Other low molecular weight plasticizers having a molecular weight in the range of 194 to 377 can be used in the place of dibutyl phthalate. Examples of such low molecular weight plasticizers are diisobutyl phthalate, dicyclohexyl phthalate, butyl benzyl phthalate, butyl octyl phthalate, butyl decyl phthalate, dibutoxyethyl phthalate, dimethyl sebacate, dibutyl sebacate, diisobutyl adipate, diisooctyl adipate and dibutoxyethyl adipate.

The proportions of low to medium molecular weight plasticizers is 0 to 66%, based on the total plasticizer. Any combination of low and medium weight plasticizers is applicable as long as to total low and medium weight plasticizers equal 0 to 66% of the total plasticizers used in the composition.

The thixotropic agents produces in the composition the ability to be hand worked and sculptured at room temperature and then to be cured at a temperature of from 220° F. to 320° F. without appreciable flow or distortion from its sculptured shape. Once a model, which has been made from the composition of this invention, has been cured, it will remain in hardened condition, having a high degree of permanence and handleability. The essential thixotropic agent of this invention is 12-hydroxystearin, and it must be present in quantities of from 10 to 50 parts by weight. Other thixotropic agents such as fumed silica can be used in quantities of from 0 to approximately 5 parts by weight. The use of other thixotropic agents such as fumed silica tends to reduce the amount of 12-hydroxystearin needed to produce an acceptable composition according to this invention.

A heat stabilizer is incorporated into the composition to protect the vinyl chloride resins and copolymers from degradation during curing of the sculptured model. Any conventional vinyl chloride heat stabilizer can be used, such as tin octoate, lead carbonate, lead sulfate, tribasic lead phosphate, triphenyl phosphite, tris (nonylphenyl) phosphite, cadmium naphthenate, cadmium 2 ethyl hexonate, cadmium laurate, cadmium phosphite, diphenyl decyl phosphite, cadmium phenate, cadmium stearate, barium phosphite, barium phenate, barium carboxylate, zinc stearate, zinc naphthenate, zinc phosphite, zinc phenate, calcium stearate, dibutyltin oxide, dibutyltin diocto-ate, dibutyltin maleate, dibutyltin mercaptide, epoxides of soybean oil, reaction products of bisphenol A and epichlorohydrin, tris decyl phosphite, mixed alkyl and alkylaryl type phosphites and other heat stabilizers known and used in the trade. The amount of stabilizer or combination of stabilizers should be no more than 15 parts per hundred parts of resin and can be as low as 0.01 part per 100 parts of resin.

Pigments, including the common organic or inorganic types, can be used for imparting color to the composition. Examples of such pigments are titanium dioxide, carbon blacks, phthalocyanine blue, phthalocyanine green and prussion blue.

The invention will be further explained in the following specific examples. However, these examples are for illustration only and are not to be construed as limiting the invention to the precise scope thereof, as it becomes a simple matter to formulate by experimentation a vast number of resin-plasticizer compositions which are suitable for the purposes of this invention.

Unless otherwise indicated, all parts are by weight.

EXAMPLE I

| | Parts by weight |
|---|---|
| Polyvinyl chloride-acetate copolymer (plastisol resin) | 100 |
| Polyvinyl chloride-acetate copolymer (diluent resin) | 100 |
| Polyester plasticizer | 40 |
| Ditridecyl phthalate (monomeric plasticizer) | 40 |
| Dibutyl phthalate (monomeric plasticizer) | 20 |
| Clay (filler) | 20 |
| 12-hydroxystearin (thioxtropic agent) | 33 |
| Fumed silica (thixotropic agent) | 1.5 |
| Tin octoate (stabilizer) | 3 |
| Titanium dioxide (pigment) | 2.5 |

The above ingredients were incorporated in the following manner. The resins, clay and pigment were added to a sigma blade double arm mixer and mixed for 5 minutes. The plasticizers and stabilizer were then added to the contents in the double arm mixer and the mixture was mixed for 10 minutes. This formed a dough-like dilatent mass from the mixture. All of the thixotropic agents were then added and mixed until the mix worked its way up to 130° F., whereupon it was dumped. This last mixing step took 15 minutes. When dumped, the product appears like a dough but would not move without a stress force being applied.

In the composition of this example, the plastisol resin was a vinyl chloride-vinyl acetate copolymer (95:5), having a particle size range of 1 to 3 microns in diameter, a relative viscosity of 2.3 in cyclohexanone at 25° C. and a Fikentscher K value of 70 as determined in cyclohexanone. The diluent resin was a vinyl chloride-vinyl acetate copolymer (97:3), having a particle size range of about 5 to 75 microns in diameter wherein 97.5% of the particles were less than 74 microns in diameter.

The polyester plasticizer was a commercially available high molecular weight, linear polyester sold under the trade name Hatco H 684. This plasticizer is reportedly made through a condensation reaction under esterification conditions employing a linear dicarboxylic acid and a mixture of glycols, and has the following properties:

| | |
|---|---|
| Specific gravity | 1.10 |
| Molecular weight | 4,000 |
| Refractive Index, $N_o^{25}$ | 1.4862 |
| Pour point, ° C. | 5.0 |
| Flash point, C.O.C. ° C. | 595 |
| Viscosity at 20° C., cps. | 105,000 |

The clay constituent of the composition of this example serves as a filler which adds a quality of smoothness to the workability of the composition. The clay also lessens the dilatent property of the platisol-plasticizer composition.

The thixtropic agents used in this example were fumed silica sold under the trade name Cab-O-Sil, and 12-hydroxystearin sold under the trade name Thixcin R.

When cooled to room temperature, the product of this example was similar in appearance and workability to a plastiline type of modeling clay. It could be hand molded or worked with standard sculpturing tools.

In place of Hatco H 684, there can be used ethylene glycol-adipate-maleate.

EXAMPLE II

The ingredients of Example I were processed as in Example I with the exception that the polyester plasticizer of exhibit I was replaced by the product of the reaction of a mixture of maleic anhydride, phthalic anhydride and adipic acid and with a mixture of ethylene glycol and diethylene glycol sold under the trade name Paraplex P 13. The product was similar to that of Example I, both in appearance and in physical properties.

EXAMPLE III

The ingredients of Example I, with the exception that the polyester plasticizer was replaced by a linear condensation polyester of 1,2 propylene glycol and sebacic acid, having a molecular weight of about 6,000, sold under the trade name Paraplex G 40, was processed as in Example I. The resulting composition was similar to the composition of Example I, both in appearance and in physical properties.

EXAMPLE IV

The composition of Example I was used to make a model in the following manner. A quantity of the composition was placed on a sculpturing table and hand formed into a rough formed model. The rough formed model was allowed to rest for 24 hours, whereupon it was worked upon with sculpturing tools to finish and detail the model. The model was then placed in an oven of approximately 260° F. for one-half hour to cure and become hard as its surface. The resulting model was tough and handleable and had the same dimensions as the finished model prior to curing.

The foregoing description and examples of this invention is for the purpose of illustration only, and is not limiting to the scope of the invention which is set forth in the following claims.

I claim:

1. A solid composition adapted to be sculptured and hand molded at ambient room temperature which can, by heating, be fused into a tough, hard to elastomeric, handleable material, said composition comprising:
    (a) approximately 100 parts by weight of a plastisol-grade vinyl chloride resin, having a particle size in the range of 1 to 5 microns in diameter,
    (b) 50 to 150 parts by weight of a diluent grade vinyl chloride resin having a particle size in the range of 5 to 75 microns in diameter,
    (c) 50 to 150 parts by weight of a plasticizer comprising
        (1) 20 to 60 parts by weight of a polymeric polyester plasticizer, having a molecular weight in the range of 569 to 8000 and a viscosity at 20° C. of from 2,000 to 200,000 centipoises,
        (2) 0 to 120 parts by weight of a monomeric plasticizer having a molecular weight in the range of 194 to 377, and
        (3) 0 to 120 parts by weight of a monomeric plasticizer having a molecular weight in the range of 378 to 875, the total of (2) and (3) being not over two-thirds of the total plasticizer, there being present at least 2 or 3,
    (d) 10 to 50 parts by weight of 12 hydroxystearin,
    (e) 0 to 5 parts by weight of fumed silica,
    (f) 0 to 50 parts by weight of fillers, and
    (g) up to 15 parts per hundred parts of total vinyl chloride resin of a heat stabilizer for vinyl chloride resins.

2. A composition as claimed in claim 1 wherein
    (a) the plastisol-grade vinyl chloride resin is selected from the group consisting of
        (1) polyvinyl chloride
        (2) vinyl chloride-vinyl acetate copolymer,
        (3) vinyl chloride-vinylidene chloride copolymer, and
        (4) vinyl chloride-propylene copolymer
    (b) the diluent grade vinyl chloride resin is selected from the group consisting of
        (1) polyvinyl chloride,
        (2) vinyl chloride-vinyl acetate copolymer,
        (3) vinyl chloride-vinylidene chloride copolymer,
        (4) vinyl chloride-propylene copolymer.

3. A composition according to claim 1 wherein the plasticizers employed are such that the plastisol forming vinyl chloride resin is soluble therein only at elevated temperature to form a plastisol.

4. A composition according to claim 1 including 1 to 5 parts of fumed silica.

References Cited

UNITED STATES PATENTS

| | | | |
|---|---|---|---|
| 2,753,314 | 7/1956 | Severs et al. | 260—41 |
| 3,091,597 | 5/1963 | Henriques | 260—899 |
| 3,252,820 | 5/1966 | Vignolo et al. | 106—272 |
| 3,563,936 | 2/1971 | Merrill et al. | 260—31.8 |

FOREIGN PATENTS

| | | | |
|---|---|---|---|
| 680,226 | 10/1952 | Great Britain | 260—899 |

OTHER REFERENCES

Penn, W. S.: PVC Technology, Maclaren & Sons Ltd., London, 1962, pp. 317–323 and 325–326.

Sarvetnick, Harold A.: Polyvinyl Chloride, Van Nostrand Reinhold Co., New York, Published Apr. 1, 1969, pp. 38, 44, 63, 183, and 250.

MORRIS LIEBMAN, Primary Examiner

J. H. DERRINGTON, Assistant Examiner

U.S. Cl. X.R.

260—31.8 R, 31.8 M, 31.8 G, 31.8 W, 41 A, 897 C, 899 R